United States Patent [19]

Tamai et al.

[11] Patent Number: 5,115,091

[45] Date of Patent: * May 19, 1992

[54] POLY(ARYLENE THIOETHER) COPOLYMERS AND PROCESS FOR PRODUCING THEREOF

[75] Inventors: Tomoji Tamai, Mie; Tetsuya Asahi, Chiba; Yozo Kondo, Mie, all of Japan

[73] Assignee: Tosoh Corporation, Yamaguchi, Japan

[*] Notice: The portion of the term of this patent subsequent to Nov. 27, 2007 has been disclaimed.

[21] Appl. No.: 376,444

[22] Filed: Jul. 7, 1989

[30] Foreign Application Priority Data

Jul. 8, 1988 [JP] Japan .................. 63-168799

[51] Int. Cl.$^5$ ................. C08G 75/10; C08G 75/02
[52] U.S. Cl. ............................ 528/388; 528/226
[58] Field of Search ................. 528/388, 226

[56] References Cited

U.S. PATENT DOCUMENTS

| | | | |
|---|---|---|---|
| 3,354,129 | 11/1967 | Edmonds, Jr. et al. | 528/388 |
| 3,987,016 | 10/1976 | Haddad et al. | 528/388 |
| 4,440,915 | 4/1984 | Asakwa et al. | 528/388 |
| 4,537,953 | 8/1985 | Kawakami et al. | 528/388 |
| 4,820,800 | 4/1989 | Geibel et al. | 528/388 |
| 4,853,443 | 8/1989 | Matsuo et al. | 525/471 |
| 4,894,434 | 1/1990 | Asahi et al. | 525/537 |
| 4,973,663 | 11/1990 | Tamai et al. | 528/388 |

FOREIGN PATENT DOCUMENTS

| | | | |
|---|---|---|---|
| 23175 | 7/1989 | European Pat. Off. | 528/388 |
| 27429 | 2/1987 | Japan . | |

OTHER PUBLICATIONS

Patent Abstracts of Japan, vol. 8, No. 19 (C-207)[14561], Jan. 26, 1984; and JP-A-58 185 625 (Ashahi Glass) 29-10-1983.

Journal of Polymer Science: Polymer Chemistry Ed., vol. 12, No. 6, Jun. 1974, pp. 1301-1311, John Wiley & Sons, Inc.; I. Haddad et al.

*Primary Examiner*—James J. Seidleck
*Assistant Examiner*—Vasu S. Jagannathan
*Attorney, Agent, or Firm*—Sughrue, Mion, Zinn, Macpeak & Seas

[57] ABSTRACT

A novel class of poly(arylene thioether) copolymers which are not only thermoplastic but thermosetting in nature. The copolymer may be prepared by copolymerizing a combination of dihalogenobenzonitrile, dihalogenobenzophenone and thioetherifying agent in a organic solvent.

The copolymers are highly resistant to heat and solvents and exhibit excellent mechanical properties at raised temperatures.

3 Claims, No Drawings

POLY(ARYLENE THIOETHER) COPOLYMERS AND PROCESS FOR PRODUCING THEREOF

This invention relates to a novel class of poly(arylene thioether) copolymers and a process for preparing the novel copolymers. In particular, the invention relates to poly(arylene thioether) copolymers that may be used either in thermoplastic or thermoset molding procedure by suitably selecting the molding conditions.

Heat resistant polymers such as epoxy and phenol resins are known in the prior art, which are polymeric compounds capable of being further cross-linked. However, the conventional resins generally have relatively low molecular weights and consequently tend to exhibit relatively poor mechanical properties. Thus, the range of possible applications for them have been often restricted.

On the other hand, thermoplastic resins are relatively high in molecular weight, although there is generally a problem in that their thermal resistance properties are not always satisfactory.

Thus, there has been a great need for the development of new polymeric materials exhibiting thermal resistance properties comparable or superior to those of the conventional thermosetting resins and displaying excellent mechanical properties at raised temperatures.

Examples of thermoplastic resins which have improved thermal resistance properties to a certain extent are disclosed, for example, in U.S. Pat. No. 3,987,016 and Japanese Patent Public Disclosure (Kokai) No. 62-27429. However, the thermal resistance properties of these known materials are still not enough and their solvent resistance properties and high-temperature mechanical strength properties are not fully satisfactory either.

An important object of the present invention is to provide a new class of polymeric materials that have excellent heat resistance and solvent resistance properties, exhibit high mechanical properties at raised temperatures and are capable of being molded, particularly by injection molding technique.

Another important object of the invention is to provide a process for producing the novel polymer materials.

We have made great efforts to achieve these and other incidental objects and, as a result, have found that the objects may be favorably achieved by a copolymer consisting of a polymeric arylene thioether structure in which the backbone chain is constituted by two kinds of repeating arylene units linked solely via sulfur atoms and in which the backbone chain carries cyano-group pendants at ortho-positions to the backbone-sulfur linkages.

Accordingly, the invention provides: a poly(arylene thioether) copolymer which comprises two kinds of repeating units represented by the following formulae:

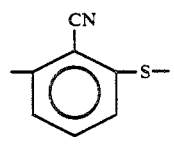  (I)

and

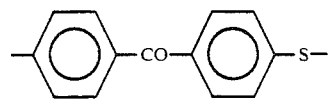  (II)

the number of the repeating units of formula (I) in the copolymer molecule being m, the number of the repeating units of formula (II) in the copolymer molecule being n, the value of $m/(m+n)$ ranging from 0.01 to 0.99, said copolymer having a reduced viscosity ($\eta sp/c$) of at least 0.2 dl/g as measured using a 0.5 g/dl solution of the copolymer dissolved in p-chlorophenol at 120° C.

The invention provides also a process for producing poly(arylene thioether) copolymers which comprises reacting a dihalogenobenzonitrile represented by formula (III):

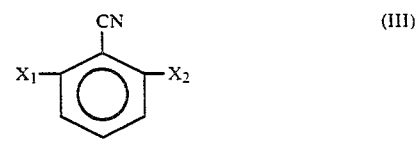  (III)

(wherein $X_1$ and $X_2$, which may be the same or different, each represent a halogen atom) and a dihalogenobenzophenone represented by formula (IV):

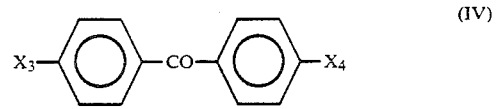  (IV)

(wherein $X_3$ and $X_4$, which may be the same or different, each represent a halogen atom) together with a thioetherifying agent in an organic solvent.

In the invention, it is essential that the backbone of the poly(arylene thioether) copolymer comprises an aromatic ring unit onto which a cyano group is directly bonded. The melting point of the copolymer may be varied within a wide range by varying the composition of copolymer.

The cyano groups carried by the polymeric backbone will effectively act in cross-linking or curing of the copolymer.

In order to achieve the purpose of the invention, it is also important that the copolymer has a reduced viscosity of at least 0.2 dl/g as measured using a 0.5 g/dl solution of the copolymer dissolved in p-chlorophenol at 120° C. If the reduced viscosity is less than 0.2 dl/g, there are problems that the mechanical and other properties of the products are unacceptably low.

Examples of the dihalogenobenzonitriles which may be used in the invention include 2,6-dichlorobenzonitrile, 2,6-dibromobenzonitrile, 2,6-di-iodobenzonitrile, 2-chloro-6-bromobenzonitrile and the like and mixtures thereof.

Examples of the dihalogenobenzophenones which may be used in the invention include 4,4'-dichlorobenzophenone, 4,4'-dibromobenzophenone, 4,4'-difluorobenzophenone, 4-chloro-4'-bromobenzophenone and the like and mixtures thereof.

The thioetherifying agent may be, for example, an alkali metal sulfide and a combination of a sulfur source with an alkali metal hydroxide.

Examples of such an alkali metal sulfide include lithium, sodium, potassium, rubidium and cesium sulfides and mixtures thereof. Examples of suitable sulfur sources include alkali metal hydrosulfides, thioamide hydrogen-sulfide, thiourea, thiocarbamate, thiocarboxylic acids, carbon disulfide, thiocarboxylates, sulfur itself, phosphorous pentasulfide and mixtures thereof. Particular examples of alkali metal hydrosulfides include lithium, sodium, potassium, rubidium and cesium hydrosulfides and mixtures thereof. Examples of alkali metal hydroxides include potassium, sodium, lithium and cesium hydroxides and mixtures thereof, with sodium hydroxide most preferred.

Generally, synthesis of the present poly(arylene thioether) copolymer comprising (I) and (II) repeating units from the dihalogenobenzonitrile (III), dihalogenobenzophenone (IV) and thioetherifying agent may be effected in an organic solvent at a raised temperature of about 50°–300° C., preferably about 100°–280° C., for a period of about 1–20 hours. The reaction is preferably carried out with stirring.

The molar ratio of the thioetherifying agent to the total of the dihalogenobenzonitrile and dihalogenobenzophenone used is in the range of about 0.70 to about 1.30, in particular from 0.90 to 1.10, the most preferably substantially equimolar. Generally, the initial concentration of the monomeric starting materials (i.e. both the dihalogeno compounds plus the thioetherifying agent) in the reaction mixture before reaction is selected within the range of from about 100 to about 2000 g per liter of the solvent. Examples of the organic solvent which may be employed in the synthesis process of the poly(arylene thioether) copolymer include amide solvents such as N,N-dimethyl formamide, N,N-dimethyl acetamide, N-methyl-2-pyrrolidone and the like; and sulfur-containing solvents such as dimethyl sulfoxide, diphenyl sulfone, sulfolane and the like.

The present novel poly(arylene thioether) copolymer is thermoplastic in nature and can be thermally shaped or molded like conventional thermoplastic resins. A notable character of the present copolymer material is that the copolymer can be advantageously crosslinked to give cured products. The crosslinking may be effected by heating the copolymer at a temperature of about 100°–400° C., preferably 200°–350° C. for a period of about 5 minutes to about 5 hours. A catalyst may be used for promoting the crosslinking reaction. Use of a catalyst will permit the reaction to be effected using a decreased temperature and/or a reduced process time. Examples of crosslinking catalysts which may be used include Lewis-acid salts, such as anhydrous aluminium chloride, anhydrous zinc chloride and anhydrous ferric chloride; phosphorous compounds, such as phosphorous pentachloride and phosphorous pentoxide; tertiary amines; amine oxides; and hydrocarbyl tin compounds, such as tetraphenyl tin.

The invention will be further illustrated with reference to the following non-limiting Examples.

EXAMPLE 1

An autoclave of a 2-liter capacity was charged with 90.34 g (0.70 moles) sodium sulfate (hydrated with 2.8 moles water per mole), 36.86 g (0.21 moles) 2,6-dichlorobenzonitrile, 123.04 g (0.49 moles) 4,4'-dichlorobenzophenone, and 700 ml N-methyl-2-pyrrolidone. The contents were heated to 250° C. with stirring and allowed to react at this temperature for a period of 3 hours. Upon completion of the reaction, the reaction mixture was cooled to room temperature and then poured into one l of water, filtered, washed with water and finally washed with methanol. The resulting polymer was obtained in a yield of 129.22 g (=98%).

The polymer exhibited a reduced viscosity ($\eta sp/c$) of 0.39 dl/g as measured using a 0.5 g/dl solution in p-chlorophenol at 120° C.

The polymer showed an infrared absorption spectrum (by the KBr tablet method) containing characteristic absorptions at 2200 $cm^{-1}$ caused by the nitrile groups, 1660 $cm^{-1}$ caused by the carbonyl linkages and 1070 $cm^{-1}$ caused by the thioether linkages in the copolymer, respectively.

The relative proportion $m/(m+n)$ of the monomeric components constituting the product copolymer was determined by comparing the intensity of the IR absorption peak of nitrile group with that of thioether linkage and appropriately calibrating the ratio. The thus resulting value of $m/(m+n)$ of the copolymer of this Example was 0.29.

Thermal analysis showed that the product polymer had a glass transition temperature Tg of 142° C., a melting point Tm of 269° C. and a thermal decomposition temperature Td of 523° C.

EXAMPLE 2

The procedure of Example 1 was repeated except that the 2,6-dichlorobenzonitrile was used in an amount of 12.28 g (0.07 moles) and the 4,4'-dichlorobenzophenone was in an amount of 158.20 g (0.63 moles). The polymer was produced in a yield of 138.59 g (=97%) and showed a reduced viscosity ($\eta sp/c$) of 0.36 dl/g.

The infrared absorption spectrum (by the KBr tablet method) contained characteristic absorptions at 2200 $cm^{-1}$ caused by the nitrile groups, 1660 $cm^{-1}$ by the carbonyl linkages and 1070 $cm^{-1}$ by the thioether linkages.

The polymer had an $m/(m+n)$ ratio of 0.10.

Thermal analysis of the polymer showed a Tg of 135° C., a Tm of 330° C. and a Td of 540° C.

EXAMPLE 3

The procedure of Example 1 was repeated except that sodium hydrogen sulfide 33.6 g (0.70 moles) in combination with sodium hydroxide 28.0 g (0.70 moles) was used in place of the sodium sulfide hydrated with 2.8 moles of $H_2O$ per mole. The resulting polymer was obtained in a yield of 147 g (=98%).

The polymer exhibited a reduced viscosity ($\eta sp/c$) of 0.32.

The infrared absorption spectrum (by the KBr tablet method) contained characteristic absorptions at 2200 $cm^{-1}$ caused by the nitrile groups, 1660 $cm^{-1}$ by the carbonyl linkages and 1070 $cm^{-1}$ by the thioether linkages.

The polymer had an $m/(m+n)$ ratio of 0.31.

Thermal analysis of the polymer showed a Tg of 140° C., a Tm of 270° C. and a Td of 526° C.

EXAMPLE 4

The procedure of Example 2 was repeated except that the polymerization was effected in two stages, the first at 150° C. for two hours and the second at 260° C. for a further 3 hours. The resulting polymer was obtained in a yield of 141.45 g (=99%) and had a reduced viscosity ($\eta sp/c$) of 0.49.

The infrared absorption spectrum (by the KBr tablet method) contained characteristic absorptions at 2200 cm$^{-1}$ caused by the nitrile groups, 1660 cm$^{-1}$ by the carbonyl linkages and 1070 cm$^{-1}$ by the thioether linkages.

The polymer had an m/(m+n) ratio of 0.30.

Thermal analysis of the polymer showed a Tg of 136° C., a Tm of 332° C. and a Td of 542° C.

EXAMPLE 5

Crosslinking

Portion of the product polymer of Example 4 was subjected to crosslinking reaction.

Sample of the polymer was dried at 120° C. for 5 hours under a reduced pressure of 1 mmHg. A portion (10 mg) of the thus pretreated sample was precisely weighed and heated, in a thermobalance, up to 350° C. at a rate of 10° C./min and then maintained at 350° C. for a further 1 hour. During the temperature-raising stage and the subsequent one-hour holding stage, no change in the weight of sample was observed.

In a separate experiment, the polymer was subjected to the crosslinking procedure under the same conditions. The thus crosslinked polymer was tested for the solubility properties in organic solvents. Though the uncrosslinked polymer was soluble in organic solvents such as 1,1,2,2-tetrachloroethane, p-chlorophenol and 1-chloronaphthalene, the crosslinked material was insoluble in all these solvents.

As above-described, the present poly(arylene thioether) copolymers have excellent heat resistance properties and are thermoplastic in nature so that they may be advantageously and successfully molded, for example, by injection molding and other molding techniques. Furthermore, since the copolymers according to the invention are crosslinkable, the present invention provides a new class of highly heat resistant, thermosetting resins which are expected to have a wide range of possible applications.

What is claimed is:

1. A poly(arylene thioether) copolymer wherein the copolymer backbone, consists of the following two repeating units of the following formulae:

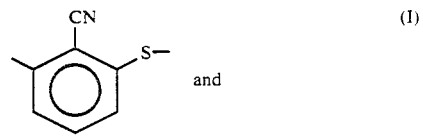

the number of the repeating units of formula (I) in the copolymer molecule being m, the number of the repeating units of formula (II) in the copolymer molecule being n, the value of m/(m+n) ranging from 0.01 to 0.99, said copolymer having a reduced viscosity (sp/c) of at least 0.2 dl/g as measured using a 0.5 g/d solution of the copolymer in p-chlorophenol at 120° C.

2. A molding composition comprising a poly(arylene thioether) copolymer as claimed in claim 1.

3. Articles formed of a poly(arylene thioether) copolymer as claimed in claim 1 which has been crosslinked.

* * * * *